(12) United States Patent
Hong et al.

(10) Patent No.: US 11,335,300 B2
(45) Date of Patent: May 17, 2022

(54) PROJECTOR AND PROJECTION METHOD

(71) Applicant: Coretronic Corporation, Hsin-Chu (TW)

(72) Inventors: Chen-Yi Hong, Hsin-Chu (TW); Wen-Hsin Chang, Hsin-Chu (TW); An-Kuo Liu, Hsin-Chu (TW); Yu-Sheng Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 35 days.

(21) Appl. No.: 16/600,583

(22) Filed: Oct. 14, 2019

(65) Prior Publication Data
US 2020/0118524 A1    Apr. 16, 2020

(30) Foreign Application Priority Data

Oct. 15, 2018    (CN) .......................... 201811196290.6

(51) Int. Cl.
| | | |
|---|---|---|
| G09G 5/10 | (2006.01) | |
| G08B 7/06 | (2006.01) | |
| G08B 21/02 | (2006.01) | |

(52) U.S. Cl.
CPC ............ G09G 5/10 (2013.01); G08B 7/06 (2013.01); G08B 21/02 (2013.01); *G09G 2354/00* (2013.01)

(58) Field of Classification Search
CPC ........ G09G 5/10; G09G 2354/00; G08B 7/06; G08B 21/02
See application file for complete search history.

(56) References Cited

U.S. PATENT DOCUMENTS

| 4,772,875 | A  | * | 9/1988  | Maddox ................. G06T 9/008 |
|-----------|----|---|---------|------------------------------------|
|           |    |   |         | 180/167                            |
| 7,857,467 | B2 |   | 12/2010 | Liu                                |
| 8,290,208 | B2 |   | 10/2012 | Kurtz et al.                       |
| 9,838,657 | B2 | * | 12/2017 | Brown ................. H04N 9/3185 |
| 2006/0170871 | A1 | * | 8/2006 | Dietz ................. G03B 21/2053 |
|           |    |   |         | 353/31                             |

(Continued)

FOREIGN PATENT DOCUMENTS

| CN | 203288215 | 11/2013 |
|----|-----------|---------|
| CN | 208861138 | 5/2019  |

OTHER PUBLICATIONS

"Office Action of China Counterpart Application", dated Mar. 1, 2021, p. 1-p. 12.

*Primary Examiner* — Michael E Teitelbaum
(74) *Attorney, Agent, or Firm* — JCIPRNET

(57) ABSTRACT

A projector and a projection method that effectively protect a to-be-protected object existing in a sensing area are provided. The projector includes a first sensor, a second sensor, an optical engine and a processor. The optical engine includes a light source. The first sensor receives a first sensed signal, generates a first signal corresponding to the first sensed signal and transmits the first signal to the processor. The second sensor receives a second sensed signal different from the first sensed signal, generates a second signal corresponding to the second sensed signal and transmits the second signal to the processor. The processor determines whether the first signal and the second signal fall into their respective pre-determined ranges. The processor transmits a light adjusting signal to control a light source.

15 Claims, 4 Drawing Sheets

(56) References Cited

U.S. PATENT DOCUMENTS

| | | | |
|---|---|---|---|
| 2007/0024438 A1* | 2/2007 | Chen | G08B 25/10 340/539.11 |
| 2014/0035913 A1* | 2/2014 | Higgins | G06Q 30/00 345/420 |
| 2014/0036235 A1* | 2/2014 | Chang | G03B 21/2053 353/31 |
| 2017/0124926 A1* | 5/2017 | Mitsuhashi | G09G 3/001 |

* cited by examiner

PROJECTOR AND PROJECTION METHOD

CROSS-REFERENCE TO RELATED APPLICATION

This application claims the priority benefit of China application serial no. 201811196290.6, filed on Oct. 15, 2018. The entirety of the above-mentioned patent application is hereby incorporated by reference herein and made a part of this specification.

BACKGROUND OF THE INVENTION

Field of the Invention

The disclosure relates to a projector and a projection method, and more particularly, relates to a projector and a projection method that may be used to effectively protect a to-be-protected object before the projector.

Description of Related Art

As shown in FIG. 1, when the projector 110 projects a high-brightness image beam or a laser beam onto the projection screen 120, if an object 130 is present in the space between the projector 110 and the projection screen 120 or in an illumination space covered by the image beam from the light source of the projector 110, the object 130 may be disturbed or even harmed.

Therefore, an infrared sensor 230 may be disposed on the projector 210, as shown in FIG. 2. The infrared sensor 230 may include an infrared emitter and an infrared receiver. When an object enters the sensing area 240 of the infrared sensor 230, the infrared receiver may receive an infrared light beam reflected from the object, and thus it is determined that the object is present in the sensing area 240. However, in a typical indoor environment, a light source 250 such as a tungsten lamp or a halogen lamp may be installed, and these lamps may emit a light beam ranging within a spectral wavelength band, and the infrared light beam from the object may partially fall into the same spectral wavelength band. When the illumination space 260 covered by the light beam from the light source 250 overlaps with the sensing area 240 of the infrared sensor 230, a false determination may be made. Therefore, how to correctly determine whether a to-be-protected object is present in an area related to the projector is a critical topic on which those skilled in the art are working.

It should be noted that the "Description of Related Art" section is provided to help understand the disclosure, and thus the content disclosed in this section may include some disclosure that does not constitute related art commonly known by persons skilled in the art. Further, the information disclosed in the "Description of Related Art" section does not mean that one or more problems to be resolved by one or more embodiments of the disclosure were acknowledged by persons skilled in the art.

SUMMARY OF THE INVENTION

The present disclosure provides a projector and a projection method which may be used to effectively protect a to-be-protected object existing in an area related to projector, so as to avoid any harm which may be caused from the light of the projector.

A projector including a first sensor, a second sensor, an optical engine and a processor is provided. The optical engine includes a light source and projects an image beam to a projection area. The processor is coupled to the first sensor, the second sensor and the optical engine. The first sensor may receive a first sensed signal. The first sensor generates a first signal corresponding to the first sensed signal and transmits the first signal to the processor. The second sensor may receive a second sensed signal different from the first sensed signal. The second sensor generates a second signal corresponding to the second sensed signal and transmits the second signal to the processor. When the processor receives the first signal and the second signal, the processor determines whether the first signal falls into a first pre-determined range, and whether the second signal falls into a second pre-determined range, such that when an object is present in a sensing area and a to-be-protected object is present in the sensing area, the processor transmits a light adjusting signal to control the light source.

A projection method adapted for a projector is provided. The projector includes a first sensor, a second sensor, an optical engine and a processor. The optical engine includes a light source and projects an image beam to a projection area. The projection method includes the following steps: the first sensor receiving a first sensed signal, the first sensor generating a first signal corresponding to the first sensed signal and transmitting the first signal to the processor; the second sensor receiving a second sensed signal different from the first sensed signal, the second sensor generating a second signal corresponding to the second sensed signal and transmitting the second signal to the processor; and the processor receiving the first signal and the second signal, the processor determining whether the first signal falls into a first pre-determined range and whether the second signal falls into a second pre-determined range, such that when an object is present in a sensing area and a to-be-protected object is present in the sensing area, a light adjusting signal is transmitted to control the light source by the processor.

Based on the above, the projector and the projection method of the disclosure determine whether an object is present in the sensing area according to the first sensed signal, and determine whether a to-be-protected object is present in the sensing area according to the second sensed signal. When an object is present in the sensing area and a to-be-protected object is present in the sensing area, the processor transmits a light adjusting signal to control the light source, so that the strength of the light source may be adjusted to protect the to-be-protected object. In addition, when the wavelength of the first sensed signal detected by the infrared sensor is determined to be in a first predetermined range, the second sensor may then be used to detect the second sensed signal, so as to determine whether a to-be-protected object exists. If a to-be-protected object does not exist, the light adjusting signal for controlling the light source may not be transmitted. As such, the case in which the determination result made by using a single infrared sensor is interfered by the indoor lamps, which may emit a light beam ranging within a spectral wavelength band, may be effectively avoided.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned disclosure easier to be comprehended, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
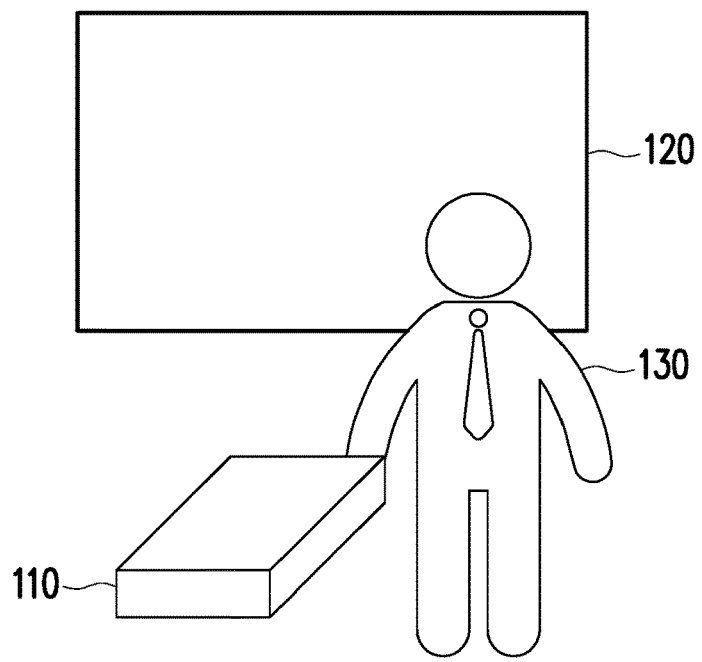
FIG. 1 is a schematic view of a projector system according to prior art.
Figure 2:
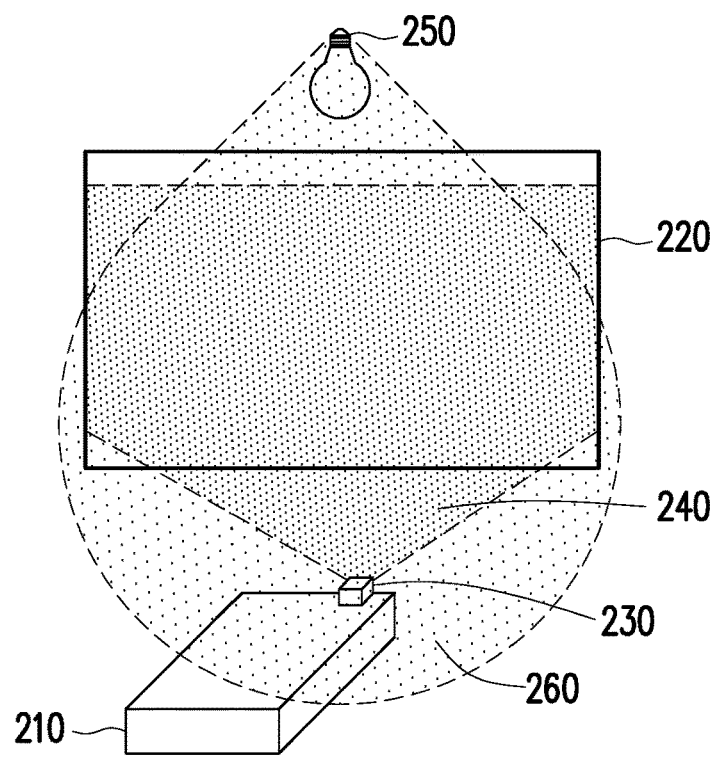
FIG. 2 is a schematic view of a situation in which a projector system is undesirably interfered by a lamp according to prior art.
Figure 3:
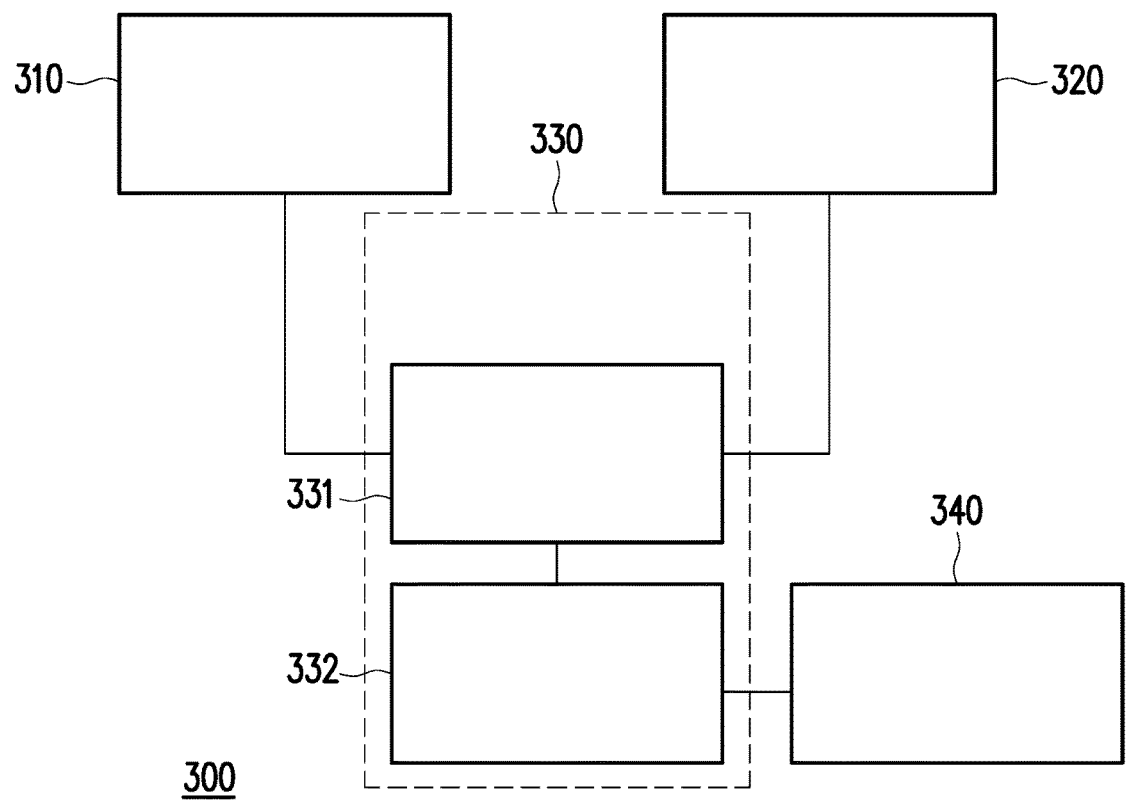
FIG. 3 is a block diagram of a projector according to an embodiment of the disclosure.
Figure 4:
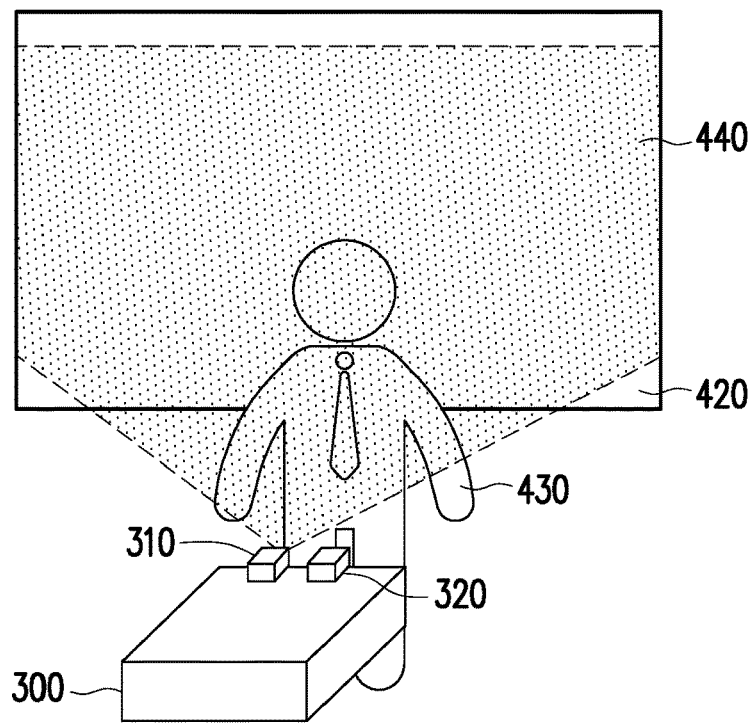
FIG. 4 is a schematic view of a projector system according to an embodiment of the disclosure.

FIG. 3 is a block diagram of a projector according to an embodiment of the disclosure. FIG. 4 is a schematic view of a projector system according to an embodiment of the disclosure.

Referring to FIG. 3 and FIG. 4, a projector 300 of the disclosure includes a first sensor 310, a second sensor 320, a processor 330 and an optical engine 340. The processor 330 is coupled to the first sensor 310, the second sensor 320 and the optical engine 340. The coupling is defined to include an electrical connection. The processor 330 includes a signal processing unit 331 and a control unit 332. The optical engine 340 may include a light source and a light source driver (not shown). An image beam is projected to a projection screen 420 (or referred to as a projection area) by the optical engine 340. It is worth noting that, the positions or the sizes of the first sensor 310 and the second sensor 320 shown in FIG. 4 are merely illustrated for examples and do not represent the actual positions or sizes of the first sensor 310 and the second sensor 320. The signal processing unit 331 is, for example, a signal processing circuit for receiving and determining signals transmitted from the first sensor 310 or the second sensor 320. That is, the signal processing circuit may be used to determine whether an object 430 enters a sensing area 440 (or a protection area) and to determine whether said object 430 is a to-be-protected object. The object 430 may be a light beam, an animal or other non-animal objects. The to-be-protected object is, for example, a human or an animal (cat, dog), such that the eyes of the human or the animal in the sensing area 440 may be protected from being harmed by the light from the projector. In addition, the control unit 332 may be a central processing unit (CPU), a programmable microprocessor for general or special use, a digital signal processor (DSP), a programmable controller, an application specific integrated circuit (ASIC), a programmable logic device (PLD), other similar devices, or a combination of these devices, for example.

The first sensor 310 and the second sensor 320 are, for example, any two sensors selected from an infrared sensor, an ultrasonic sensor, an infrared temperature sensor, an image sensor and an infrared camera, and the first sensor 310 and the second sensor 320 are different types of sensors.

The first sensor 310 may receive a first sensed signal, generates a first signal corresponding to the first sensed signal and transmits the first signal to the processor 330. The second sensor 320 may receive a second sensed signal different from the first sensed signal, generates a second signal corresponding to the second sensed signal and transmits the second signal to the processor 330. In an embodiment, the first sensed signal and the second sensed signal may be analog signals, and the first signal and the second signal may be digital signals. The first sensor 310 and the second sensor 320 may convert the received analog signals into digital signals and transmit them to the processor 330.

In an embodiment, the first sensor 310 is an infrared sensor, and the first sensed signal includes an optical signal having a wavelength range. For example, the infrared sensor may receive optical signals having a wavelength range from 760 nanometers (nm) to 1 millimeter (mm), but the invention is not limited thereto. The infrared sensor may determine whether an object 430 exists in the sensing area 440 based on the intensity of the light beam reflected by the object 430. In another embodiment, the first sensor 310 is an ultrasonic sensor, and the first sensed signal includes an ultrasonic signal. The ultrasonic sensor may determine whether an object 430 enters the sensing area 440 based on the echo received by the receiver from the object 430. The sensing area 440 may be greater than or equal to the space between the projector 300 and the projection screen 420, or may be greater than or equal to the illumination space covered by the image beam from the projector 300.

In an embodiment, the second sensor 320 is an infrared temperature sensor, and the second sensed signal includes a heat radiation signal. The infrared temperature sensor may determine whether the object 430 is human or any other to-be-protected object based on the determination result that whether temperature of the object 430 is between 35 and 40 degrees Celsius. In another embodiment, the second sensor 320 is an image sensor or an infrared camera, and the second sensed signal includes an image signal. The image sensor or the infrared camera may recognize the shape of the object by analyzing the image, so as to determine whether the object 430 is a human or any other to-be-protected object.

In an embodiment, the first sensor 310 and the second sensor 320 may convert an environmental signal detected (for example, the first sensed signal and the second sensed signal) into a digital signal (for example, the first signal and the second signal) and may transmit the digital signal(s) to the signal processing unit 331. The signal processing unit 331 may determine whether the received digital signals fall in a its respective corresponding pre-determined range (for example, a first pre-determined range and a second pre-determined range which are digital value ranges), so as to determine whether an object 430 enters the sensing area 440 (or named as the protection area) and to determine whether said object 430 is a to-be-protected object. If the signal processing unit 331 determines that the received first digital signal falls in a first pre-determined range (for example, a first digital value range), a result may obtained that an object 430 is present in the sensing area 440. Further, if the signal processing unit 331 determines that the received second digital signal falls in a second pre-determined range (for example, a second digital value range), a further result may obtained that the object 430 is a to-be-protected object (i.e., the to-be-protected object is present in the sensing area 440). The signal processing unit 331 may transmit a warning signal to the control unit 332. It is worth noting that, for example, a pre-determined digital value range may be stored in a storage device (not shown) in the processor 330 in advance. The storage device may be a movable random access memory (RAM), a read-only memory (ROM), a flash memory, other similar devices, or a combination of the above. However, the invention is not limited thereto.

With the warning signal received, the control unit 332 may output a modulating signal to the optical engine 340, such that the brightness of a light source of the optical engine 340 may be reduced, or such that the light source of the optical engine 340 may be turned off. In other words, the control unit 332 may be used to reduce the current through the light source, thereby reducing the light intensity, and even to zero.

In an embodiment, the projector 300 may also include a buzzer (not shown in the drawings). When a to-be-protected object is determined to be present in the sensing area 440 by the processor 330, the processor 330 may transmit a warning signal to the buzzer, and the buzzer may thus generate a warning tone to warn the user.

In an embodiment, the projector 300 may also include an indicating lamp (not shown in the drawings). When a to-be-protected object is determined to be present in the sensing area 440 by the processor 330, the processor 330 may transmit a warning signal to the indicating lamp, and the indicating lamp may thus generate a warning light to warn the user.

In an embodiment, when a to-be-protected object is determined to be present in the sensing area 440 by the processor 330, the processor 330 may transmit a warning signal to the optical engine 340, and the projector may thus project a revised image with a warning image to warn the user.

In case that the first sensor 310 is an infrared sensor and the second sensor 320 is selected from the followings: an ultrasonic sensor, an infrared temperature sensor, an image sensor and an infrared camera, the processor 330 may determine whether the wavelength of the optical signal received by the infrared sensor falls into a pre-determined range (for example, between 760 nm and 1 mm), and the processor 330 may also determine whether the second sensed signal received by the second sensor 320 falls into another pre-determined range (for example, various pre-determined value ranges corresponding to various types of sensor, where for example, a pre-determined value range corresponding to an infrared temperature sensor may be from 35 degrees to 38 degrees Celsius). These determination results may be used to determine whether a to-be-protected object exists in the sensing area 440. In case that the wavelength of the optical signal received by the infrared sensor falls into the predetermined range, while that a determination that no to-be-protected object exists in the sensing area 440 is made based on the second sensed signal received by the second sensor 320, the processor 330 may not transmit the light adjusting signal for the light source of the optical engine 340. As such, the case in which a false adjustment or shut down of the light source of the projector 300 is caused due to a false determination that a to-be-protected object exists in the sensing area 440 may be effectively avoided. The false determination may be made due to the fact that a light beam from a tungsten lamp or halogen lamp indoors falls into the pre-determined range set for the infrared sensor, or due to the fact that the existing object is not a to-be-protected object.

It is worth noting that, although the above embodiments have explained the use of two types of sensors for the operation of determining whether a to-be-protected object is present in front of the projector 300, the present disclosure is not limited thereto. In another embodiment, three or more different types of sensors may also be used on the projector 300 of the present disclosure for the operation of determining whether a to-be-protected object is present in front of the projector 300, so as to increase the accuracy of the final determination.

Figure 5:
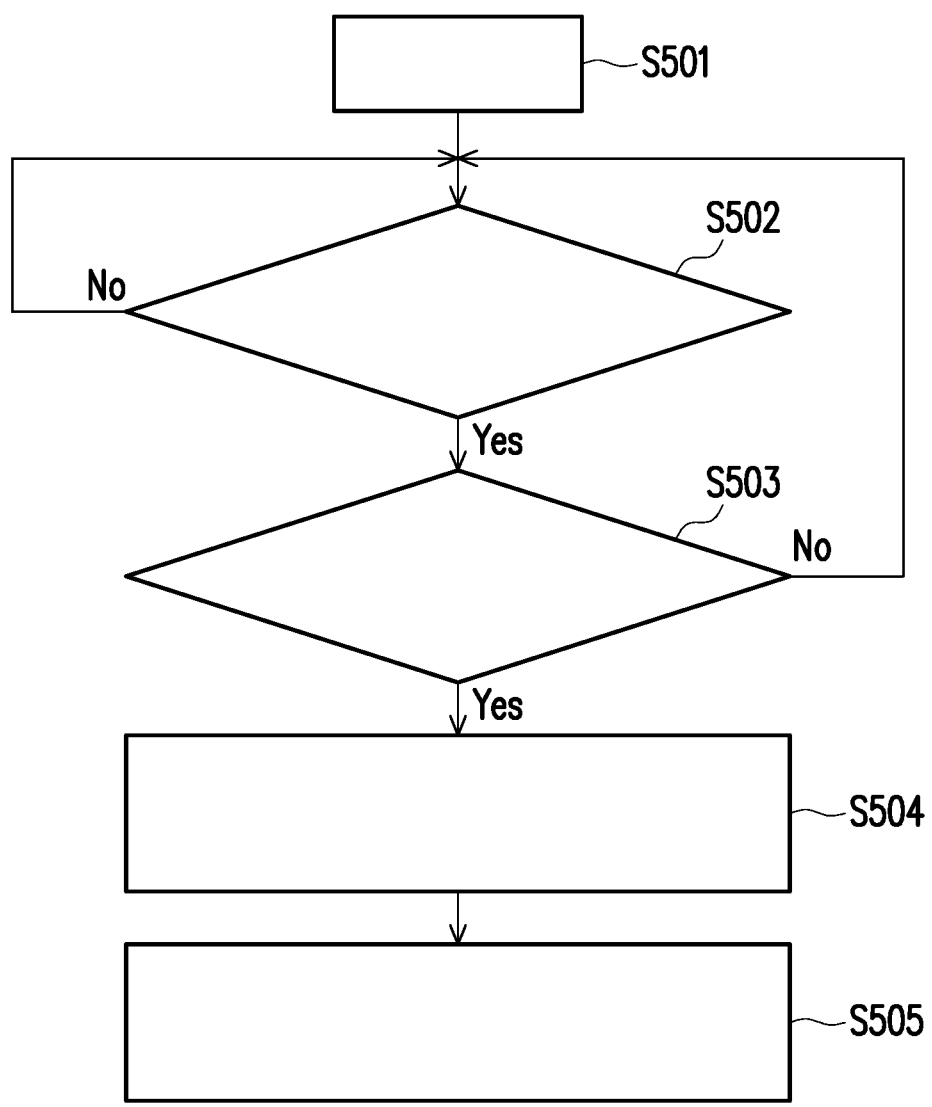
FIG. 5 is a flow chart of a projection method according to an embodiment of the disclosure.

FIG. 5 is a flow chart of a projection method according to an embodiment of the disclosure.

Referring to FIG. 5, in step S501, the process starts.

In step S502, the first sensor may be used to continuously detects whether an object enters a protection area.

If the first sensor detects that an object has entered the protection area, in step S503, the second sensor may then be used to detect whether the object is a to-be-protected object.

If the second sensor detects that the object is not a to-be-protected object, the process may return to step S502, that is, and the first sensor may be used to continuously detect whether an object enters a protection area. If the second sensor detects that the object is a to-be-protected object, in step S504, a signal processing unit generates a warning signal.

In step S505, a control unit transmits the warning signal to an optical engine, such that the brightness of a light source of the optical engine may be reduced, or such that the light source of the optical engine may be turned off.

Figure 6:
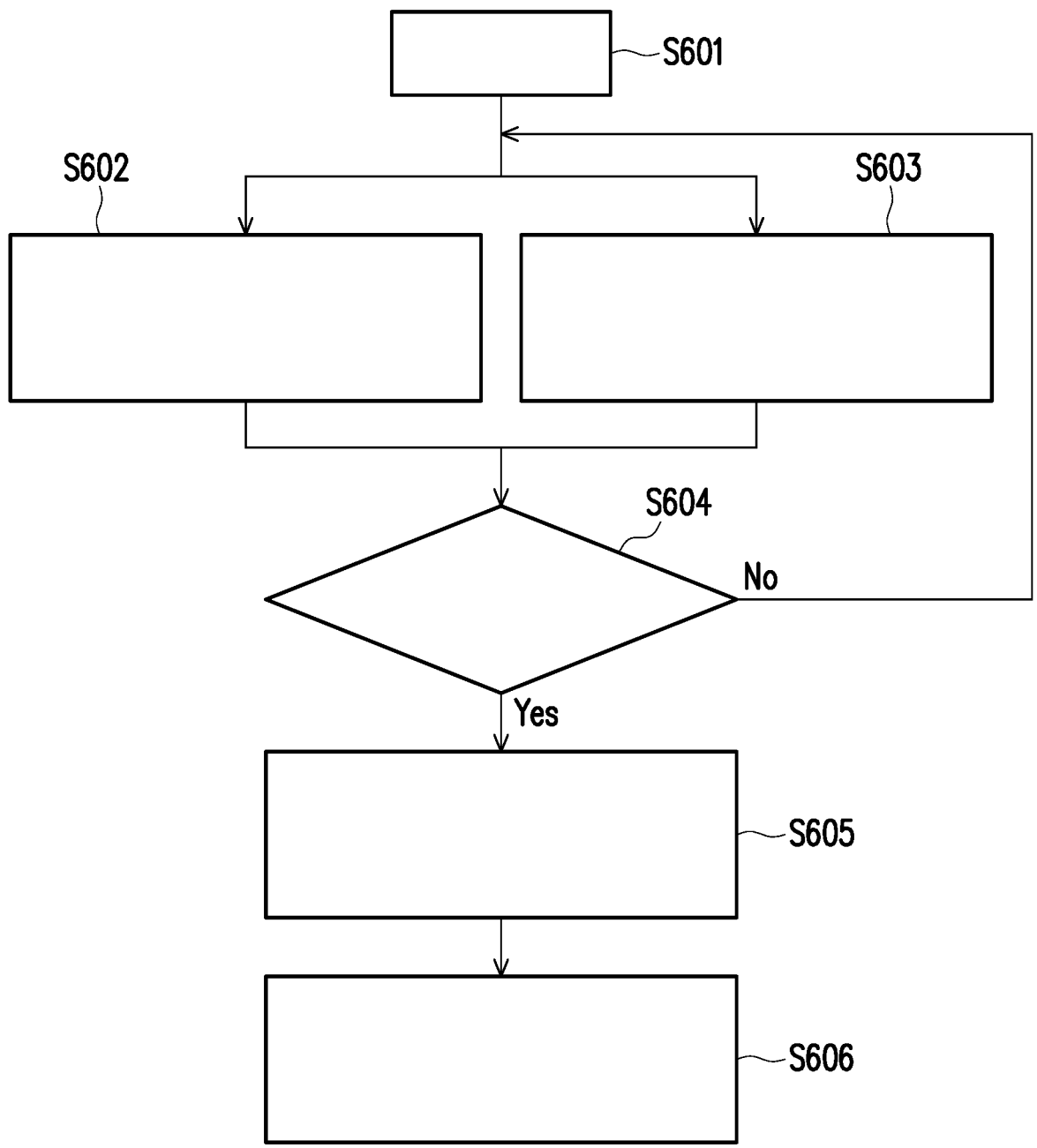
FIG. 6 is a flow chart of a projection method according to another embodiment of the disclosure.

FIG. 6 is a flow chart of a projection method according to another embodiment of the disclosure.

Referring to FIG. 6, in step S601, the process starts.

In step S602, the first sensor receives a first sensed signal, generates a first signal, and transmits the first signal to the signal processing unit.

In step S603, the second sensor receives a second sensed signal, generates a second signal, and transmits the second signal to the signal processing unit.

In step S604, the signal processing unit determines whether the first signal falls into a first pre-determined range, and whether the second signal falls into a second pre-determined range, so as to determine whether an object enters the protection area and to determine whether said object is a to-be-protected object.

If no object enters the protection area, or the object entering the protection area is not a to-be-protected object, the process may return to step S602 and S603.

If an object enters the protection area and said object is a to-be-protected object, in step S605, a signal processing unit generates a warning signal.

In step S606, a control unit transmits the warning signal to an optical engine, and reduces the brightness of a light source of the optical engine or turns off the light source of the optical engine. such that the brightness of a light source of the optical engine may be reduced or be turned off.

In summary, the projector and the projection method of the disclosure determine whether an object is present in the sensing area according to the first sensed signal, and determine whether a to-be-protected object is present in the sensing area according to the second sensed signal. When an object is present in the sensing area and a to-be-protected object is present in the sensing area, the processor transmits a light adjusting signal to control the light source, so that the strength of the light source may be adjusted to protect the to-be-protected object. For example, when the wavelength of the first sensed signal detected by the infrared sensor is determined to be in a first predetermined range, the second sensor may then be used to detect the second sensed signal, so as to determine whether a to-be-protected object exists. If a to-be-protected object does not exist, the light adjusting signal for controlling the light source may not be transmitted. As such, the case in which the determination result made by using a single infrared sensor is interfered by the indoor lamps, which may emit a light beam ranging within a spectral wavelength band, may be effectively avoided.

It will be apparent to persons skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

The above are exemplary embodiments of the disclosure and should not be construed as limitations to the scope of the disclosure. That is, any simple change or modification made based on disclosure of the claims and specification of the disclosure falls within the scope of the disclosure. Any of the embodiments or any of the claims of the disclosure does not necessarily achieve all of the advantages or features disclosed by the disclosure. Moreover, the abstract and the title of the disclosure are merely used to aid in search of patent files and are not intended to limit the scope of the disclosure. In addition, terms such as "first" and "second" in the specification or claims are used only to name the elements or to distinguish different embodiments or scopes and should not be construed as the upper limit or lower limit of the number of any element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising: a first sensor, a second sensor, an optical engine and a processor, wherein
   the optical engine comprises a light source and projects an image beam to a projection area,
   the processor is coupled to the first sensor, the second sensor and the optical engine,
   the first sensor receives a first sensed signal, generates a first signal corresponding to the first sensed signal, and transmits the first signal to the processor, wherein the first sensor is an infrared sensor and the first sensed signal comprises an optical signal having a wavelength range,
   the second sensor receives a second sensed signal different from the first sensed signal, the second sensor generates a second signal corresponding to the second sensed signal and transmits the second signal to the processor, and
   when the processor receives the first signal and the second signal, the processor concurrently determines whether the first signal falls into a first pre-determined range and whether the second signal falls into a second pre-determined range so as to determine whether an object enters a sensing area and to determine whether the object is a to-be-protected object, wherein when the first signal falls into the first pre-determined range while the second signal falls into the second pre-determined range, the processor determines that the object entering the sensing area is the to-be-protected object, and the processor transmits a light adjusting signal to reduce a brightness of the light source or to turn off the light source, wherein when either the first signal does not fall into the first pre-determined range or the second signal does not fall into the second pre-determined range, the processor determines that the to-be-protected object is absent in the sensing area, and the processor does not transmit the light adjusting signal to change the brightness of the light source and the first sensor continuously detects whether the object enters the sensing area.

2. The projector according to claim 1, wherein
when the processor determines that the first signal falls into the first pre-determined range, a result is obtained that the object is present in the sensing area, and thus the second sensor receives the second sensed signal different from the first sensed signal, the second sensor generates the second signal corresponding to the second sensed signal and transmits the second signal to the processor.

3. The projector according to claim 1, wherein the sensing area comprises a space between the projector and the projection area.

4. The projector according to claim 1, wherein the sensing area comprises an illumination space covered by the image beam from the light source.

5. The projector according to claim 1, wherein the second sensor is an infrared temperature sensor and the second sensed signal comprises a heat radiation signal.

6. The projector according to claim 1, wherein the second sensor is an image sensor or an infrared camera, and the second sensed signal comprises an image signal.

7. The projector according to claim 1, wherein the projector further comprises a buzzer, and wherein when the processor determines that the object is present in the sensing area and determines that the object is the to-be-protected object, the processor transmits a warning signal to the buzzer, and the buzzer generates a warning tone according to the warning signal.

8. The projector according to claim 1,
wherein the projector further comprises an indicating lamp, and
wherein when the processor determines that the object is present in the sensing area and determines that the object is the to-be-protected object, the processor transmits a warning signal to the indicating lamp, and the indicating lamp generates an indicating light according to the warning signal.

9. The projector according to claim 1, wherein the processor transmits a warning signal to the optical engine and the projector projects a revised image with a warning image.

10. A projection method adapted for a projector, wherein the projector comprises: a first sensor, a second sensor, an optical engine and a processor, the optical engine comprising a light source and projecting an image beam to a projection area, and the projection method comprising:
the first sensor receiving a first sensed signal, the first sensor generating a first signal corresponding to the first sensed signal and transmitting the first signal to the processor, wherein the first sensor is an infrared sensor and the first sensed signal comprises an optical signal having a wavelength range;
the second sensor receiving a second sensed signal different from the first sensed signal, the second sensor generating a second signal corresponding to the second sensed signal and transmitting the second signal to the processor; and
the processor receiving the first signal and the second signal, the processor concurrently determining whether the first signal falls into a first pre-determined range and whether the second signal falls into a second pre-determined range so as to determine whether an object enters a sensing area and to determine whether the object is a to-be projected object,
wherein when the first signal falls into the first pre-determined range while the second signal falls into the second pre-determined range, the processor determining that the object entering the sensing area is the to-be-protected object, and a light adjusting signal is transmitted to reduce a brightness of the light source or to turn off the light source by the processor,
wherein when either the first signal does not fall into the fire pre-determined range or the second signal does not fall into the second pre-determined range, the processor determining that the to-be-protected object is absent in the sensing area, and the processor does not transmit the light adjusting signal to change the brightness of the light source and the first sensor continuously detecting whether the object enters the sensing area.

11. The projector according to claim 10, wherein when the processor determines that the first signal falls into the first pre-determined range, a result is obtained that the object is present in the sensing area, the thus second sensor receives the second sensed signal different from the first sensed signal, the second sensor generates the second signal corresponding to the second sensed signal and transmits the second signal to the processor.

12. The projection method according to claim 10, wherein the sensing area comprises a space between the projector and the projection area.

13. The projection method according to claim 10, wherein the sensing area comprises an illumination space covered by the image beam from the light source.

14. The projection method according to claim 10, wherein the second sensor is an infrared temperature sensor and the second sensed signal comprises a heat radiation signal.

15. The projection method according to claim 10, wherein the second sensor is an image sensor or an infrared camera, and the second sensed signal comprises an image signal.

* * * * *